April 22, 1924.

J. R. HOFFMAN

AUXILIARY WHEEL FOR AUTOMOBILES

Filed Dec. 26, 1922

1,491,097

INVENTOR
JAMES R. HOFFMAN
BY *J. L. Rivers*
ATTORNEY

Patented Apr. 22, 1924.

1,491,097

UNITED STATES PATENT OFFICE.

JAMES R. HOFFMAN, OF SEATTLE, WASHINGTON.

AUXILIARY WHEEL FOR AUTOMOBILES.

Application filed December 26, 1922. Serial No. 608,838.

*To all whom it may concern:*

Be it known that I, JAMES R. HOFFMAN, a citizen of the United States, residing at Seattle, in the county of King and State of Washington, have invented a new and useful Auxiliary Wheel for Automobiles, of which the following is a specification.

My invention refers particularly to improvements in devices for temporarily superseding a broken or disabled wheel of an automobile to enable the machine to be brought in for repairs under its own power, and the objects of my improvement are, to provide a portable rubber-tired wheel suitably mounted for travel and easily attachable to either the front or rear axle of the automobile; to provide an effective screw adjustment by which the distance between the axle and the lower tread portion of the auxiliary wheel can be increased or decreased to permit the disabled wheel to remain idle and at the same time to practically maintain the equilibrium of the automobile; to provide supports whereby a wheel of comparatively large diameter can be utilized, and a swiveled connection therefor; to provide a device which will function as an emergency jack; and, to provide a device of such size and weight as to be conveniently carried in the automobile when not in use.

In the accompanying drawing—

Figure 1:
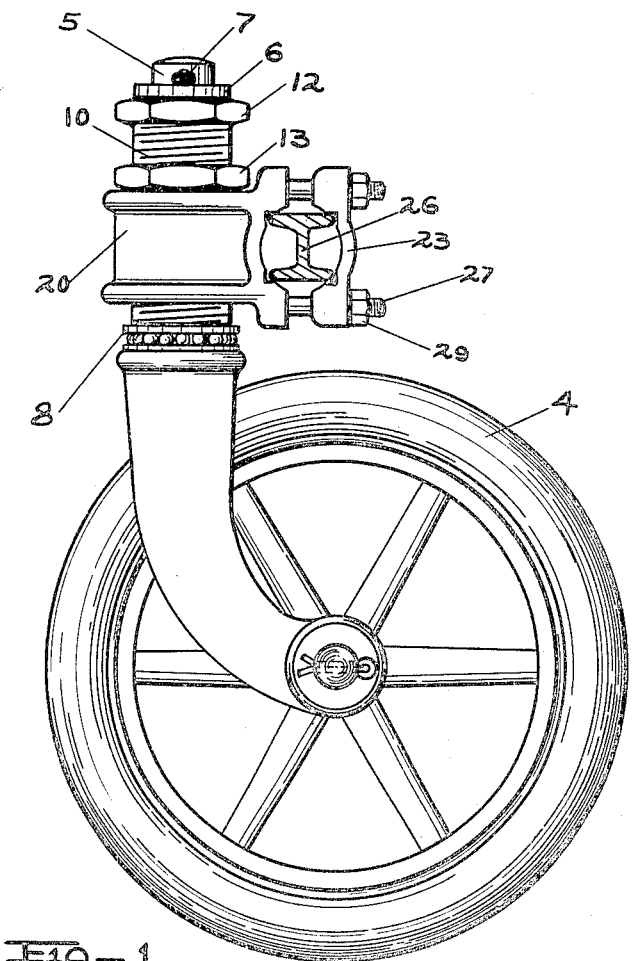

Figure 1 is a side elevation of the invention, showing in cross section an I beam axle to which it is attached.

Figure 2:
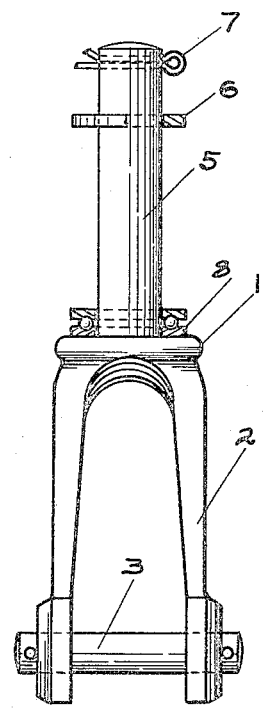

Fig. 2, an elevation of the body of the same, showing axle for wheel mounted in place in pivot fork, ball end thrust in section, top retaining washer partly in section, and retaining key in top of shaft.

Figure 3:
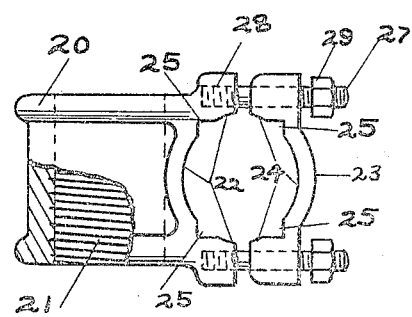

Fig. 3, a side elevation of the axle clamp, being partly in section to show the interiorly threaded portion in which the adjusting sleeve is designed to be mounted, also form of clamp adapting it to embrace and be secured either to an I beam or round axle.

Figure 4:
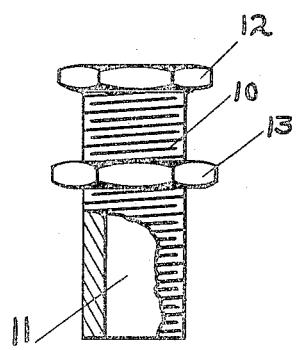

Fig. 4, an elevation of said sleeve, partly in section, terminating at its upper portion in an integral hexagonal head, and including a retaining nut for the clamp threaded on the sleeve.

Referring more particularly to the drawing, the body of the device 1 terminates at one end in the pivot fork 2, carrying the axle 3 for a rubber tired wheel 4. The other end of the body terminates in the shaft 5, and carries the washer 6 and the retaining key 7.

8 denotes a pair of annular grooved bearing members encircling the shaft and disposed at the base thereof, between which balls are mounted, to provide a ball-bearing swiveled connection for the wheel.

The sleeve 10, having a smooth inside borelike opening 11 which permits it to fit rotatably on the shaft 5, is mounted on said shaft and seated on the top one of said members as indicated in Fig. 1. It is exteriorly threaded and provided with an integral hexagonal head 12. 13 designates a retaining nut for the clamp, threaded on said sleeve.

The clamp comprises the body 20, having a cylindrical opening 21 extending through it, interiorly threaded, and designed to engage the threads of the sleeve, as indicated in Fig. 1, the nut 13 serving to retain said body at any adjusted position on the sleeve. The body of the clamp is provided at one side with curved portions 22, the movable clamping member 23 having reversely curved portions 24, affording a plurality of curved surfaces for embracing a cylindrical axle. The recesses 25 in said body and member are adapted to engage the angular portions of an I beam axle 26, as indicated in Fig. 1. As is obvious, the clamp is secured in place on the axle by the bolts 27, extending through the member 23, threaded into the body as indicated at 28, Fig. 3, and retained by the nuts 29.

In utilizing this auxiliary wheel, it can be clamped to the end of the axle from which the disabled wheel has been removed. It may prove inconvenient, however, to remove said last named wheel, and ordinarily, where the roads are good and the distance to be traveled is short, it is not necessary to do so, the device being secured to the axle adjacent the steering knuckle and the disabled wheel. With the device mounted on an axle, as indicated in Fig. 1, a turning of the hexagonal head 12 with a wrench will raise the axle, thereby lifting the disabled wheel from the path of travel, and when the clamp is secured in its adjusted position by the lock nut 13, the auxiliary wheel will function as a substitute for the same.

As an emergency jack, the device is secured to an axle at any suitable place along its length in the same manner, and the axle raised, as heretofore described. Obviously, a reverse movement of the screw adjustment will lower it.

As it will be noted, the swiveled ball-bearing connection between the wheel and the axle enables it to turn in unison with the wheel at the other end of the axle, and is instrumental in reducing the friction occasioned thereby. The parts supporting the wheel and securing it to the automobile are so proportioned as to permit the use of a wheel and a rubber tire of maximum size, considering their location when in operative position, thus contributing to smoothness of travel and durability, and affording compact mechanism easily carried in the machine.

I claim:

1. A device of the class described, comprising a body, a wheel rotatably connected therewith, a shaft disposed above the wheel, a sleeve, exteriorly threaded and provided with an angular head, rotatably mounted on the shaft, means for retaining the sleeve on the shaft, a clamp threaded to the sleeve and adjustable longitudinally thereon, and means for retaining the clamp in adjusted position on the sleeve.

2. A device of the class described, comprising a body terminating at one end in a pivot fork, a wheel rotatably mounted in said fork, the other end of the body terminating in a shaft, a pair of annular grooved bearing members encircling the shaft and disposed at the base thereof, balls mounted therebetween, a sleeve, exteriorly threaded and provided with an angular head, rotatably mounted on the shaft and seated on the top one of said members, means for retaining the sleeve on the shaft, a clamp, including a body threaded on said sleeve having a face provided with curved and recessed portions adapted to engage a round or an I beam axle, a clamping member bolted to the body of the clamp having oppositely disposed curved and recessed portions, and means for retaining the clamp in adjusted position on the sleeve.

3. In a device of the class described having a body and a wheel rotatably connected therewith, a shaft extending from the body, a sleeve, exteriorly threaded and provided with an angular head, rotatably mounted on the shaft, means for retaining the sleeve on the shaft, a clamp threaded to said sleeve and adjustable longitudinally thereon, and means for retaining the clamp in adjusted position on the sleeve.

4. In a device of the class described having a body and a wheel rotatably connected therewith, a shaft extending from the body, a sleeve, exteriorly threaded and having an integral angular head, rotatably mounted on the shaft, a pair of members interiorly grooved to define a ball race disposed at the base of the shaft and providing a seat for the sleeve, balls mounted therein, means for retaining the sleeve on the shaft, a clamp threaded to said sleeve, and a nut for securing the clamp in adjusted position on the sleeve.

JAMES R. HOFFMAN.